UNITED STATES PATENT OFFICE 2,505,559

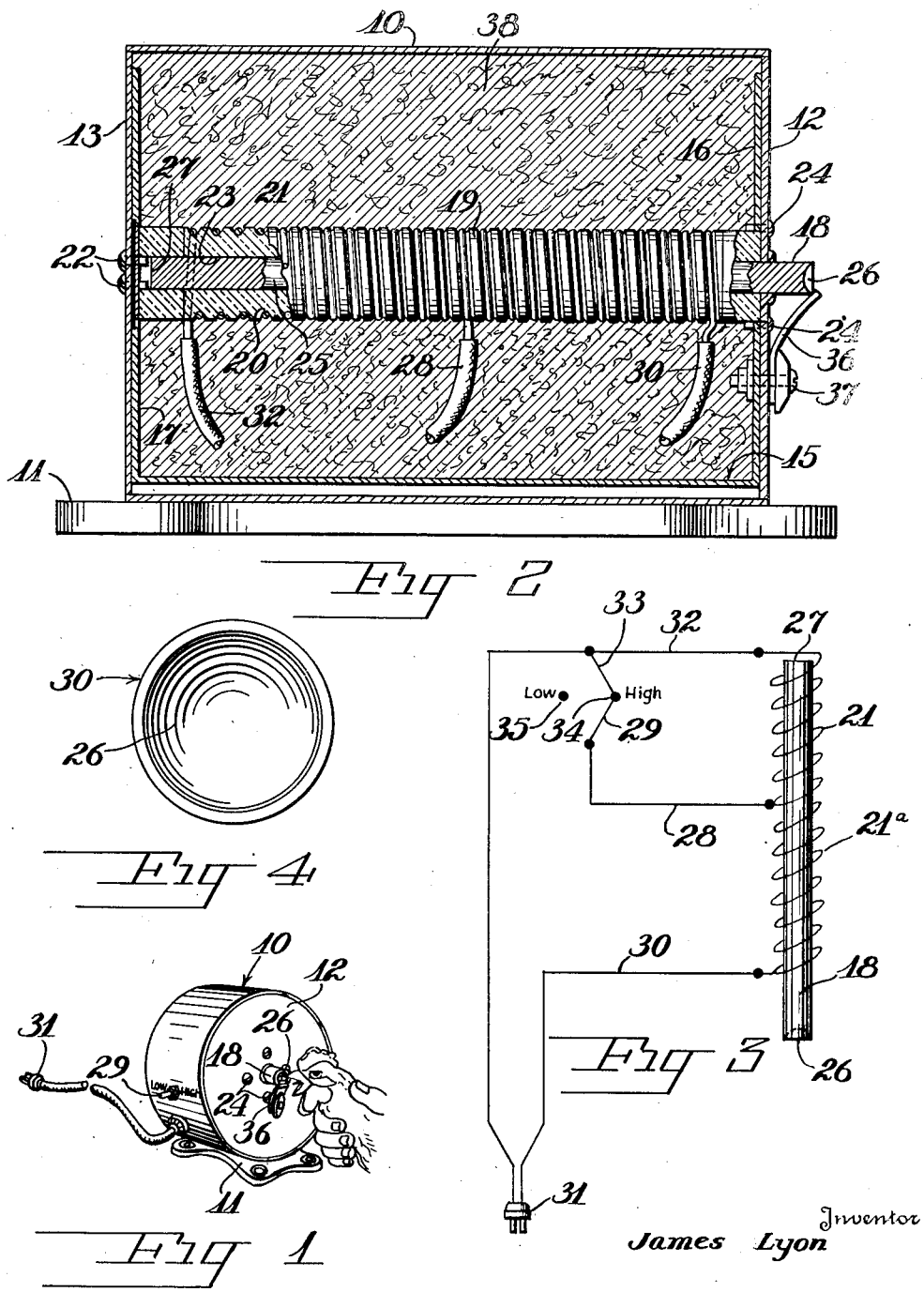

BEAK BURNER FOR FOWL

James Lyon, San Diego, Calif.

Application August 27, 1946, Serial No. 693,324

1 Claim. (Cl. 128—303.1)

This invention relates to beak burners for fowls. An object of the invention is the provision of a simple and effective device for burning off the ends of bills of fowls to prevent fowls from injuring other fowls by pecking, said device including a readily removable searing tool which is so constructed that either end may be employed when different types of searing methods are necessary.

Another object of the invention is the provision of a device for cauterizing the ends of the bills of fowls in which a reversible rod is heated to the desired temperature by an electric heating element, one end of the rod having a concave surface to which the end of the upper beak is applied for removing the end of said beak while forming a curved end on said beak, the other end of the rod being flat for rapidly removing the sharp end of the beak.

A further object of the invention is the provision of a device for removing the sharp ends of the upper beaks of fowls, while cauterizing the same and eliminating bleeding, said device including a reversible cauterizing rod which has one end formed with a concave surface for removing and curving the end of the beak, the other end being flat for removing the sharp ends of the beaks in a rapid manner when great numbers of fowls must be treated to prevent cannibalism, an electric heating element being employed in connection with a ceramic core which receives the rod, the electric heating element being tapped to insure a rapid heating and a comfortable operating temperature.

The invention consists in the novel construction, arrangement and combination of parts hereinafter more particularly described and claimed.

In the drawings:

Figure 1 is a view in perspective showing my improved beak cauterizing device.

Figure 2 is an enlarged longitudinal vertical section of the device.

Figure 3 shows a wiring diagram for the device, and

Figure 4 is a greatly enlarged view, of one end of a reversible cauterizing rod.

Referring more particularly to the drawings, 10 designates a casing for housing the elements forming the cauterizing device. This casing is mounted on a base 11 which is adapted to be secured to a table or stand for convenient operation. Opposite end walls 12 and 13 are shown as circular, although they may be of any configuration.

A bracket 15 of rectangular design has end bars 16 and 17 frictionally engaged between respective end walls 12 and 13 of the casing 10. The end wall 12 is formed with an opening 18 through which a cauterizing rod may project as will be described.

A refractory tube 19 which may be made of ceramic materials has a spiral groove 20 at its outer surface to receive a resistance coil 21 which becomes highly heated when a current is passed therethrough. The tube 19 is of a length to extend between the bars 16 and 17, being held in position at the rear end by machine screws 22 extended through the wall 13 and the bar 17 and into the bore 23 of the tube. The front end of the tube is supported by machine screws 24 spaced equidistant about the opening 18 and of a length so as to be in supporting engagement with the adjacent end of the tube.

A reversible cauterizing rod 25 has one end provided with a concave surface 26 while the other end 27 has a flat surface. This rod is inserted into the longitudinal passage 23 of the tube 19 and is freely removable therefrom so that either end of the rod may be projected from the casing as shown in Figures 1 and 2 for operative purposes while one end remains housed and idle.

Referring more particularly to Figures 2 and 3, it will be seen that the end of the coil 21 is tapped by a wire 28 which is connected to a switch 29. A wire 30 connects one end of the coil with a plug 31. The other end of the coil is connected by a wire 32 to the plug 31 so that when the plug is inserted into a socket in communication with a circuit, current will pass through the entire coil or through a portion 21—a of said coil, depending upon the position of the switch 29, as will be explained hereinafter.

A wire 33 connects an intermediate point of the wire 32 with a switch contact 34 indicated as "High." The switch 29 may be rocked to engage a dead contact 35 marked "Low."

A spring clip 36 is attached to the end wall 12 by the bolt 37. The curved free end of said clip presses against the projecting end of the rod 25 for maintaining said rod in a temporarily fixed position in the tube 19.

The operation of my device is as follows:

When the concave end 26 of the rod 25 is employed as shown in Figures 2 and 4, the pointed end of the upper beak portion is burned off, leaving the free end of the cauterized beak curved so that the fowl cannot pick sore spots on another fowl which causes cannibalism among the fowl, nor can the debilled fowl pull feathers from another.

When the flat end 27 is used the beaks may be cauterized more rapidly but with this type of cauterizing surface the upper beaks are burned off sharply, providing a straight cut across the beak.

In view of the fact that the rod is encased with the ceramic core 19 and freely removable, said rod may be withdrawn and reversed in position when desired. This construction eliminates the necessity of returning the whole unit to the factory or repair shop for the application of a new cauterizing rod.

The insertion of the plug in a suitable socket places the unit in condition for operation after the proper end of the rod 25 is exposed for contact with a beak.

When the switch has been moved to "Low" current will flow through the entire coil 21. On the other hand, moving the switch to "High" will raise the current to flow only through the portion 21—a of said coil to provide a high temperature. Nevertheless, when the switch has been moved to "Low" a comfortable operating temperature will be maintained.

A packing 38 formed of exploded silica insulation is filled into the casing and surrounds the coil 21 and other parts within the housing.

Although a preferred and practical embodiment of the invention is disclosed herein, it is to be understood that various modifications may be made within the scope of the appended claim without departing from the spirit of the invention.

I claim:

A cauterizing device for beaks of fowls comprising a support, a refractory core carried by the support, a cauterizing rod in the core, the length of the rod being greater than the length of said core so that one end of the rod will project beyond the adjacent end of the core so that the projecting end of the rod when heated may be engaged by a beak of a fowl, means for heating the rod in the core, one end of the rod having a flat surface, the other end of the rod having a concave surface, and a spring clip releasably mounted upon the support and having a free end in contacting engagement with the projecting end of the rod whereby said rod may be readily removed from the core so that either end of the rod may be projected from the core and used for cauterizing beaks of fowls.

JAMES LYON.

REFERENCES CITED

The following references are of record in the file of this patent:

UNITED STATES PATENTS

| Number | Name | Date |
| --- | --- | --- |
| 1,011,607 | Fulton | Dec. 12, 1911 |
| 1,567,878 | Van Tine | Dec. 29, 1925 |
| 1,767,607 | Moulthrop | June 24, 1930 |
| 1,867,736 | Finkeldey | July 19, 1932 |
| 2,283,464 | Kitchener | June 30, 1942 |
| 2,359,569 | Lyon | Oct. 3, 1944 |